United States Patent [19]

Juvin et al.

[11] Patent Number: 4,545,067
[45] Date of Patent: Oct. 1, 1985

[54] PROCESS FOR AUTOMATIC IMAGE RECOGNITION

[75] Inventors: Didier Juvin, Paris; Benoit Dupeyrat, Chilly-Mazarin, both of France

[73] Assignee: Commissariat a l'Energie Atomique, Paris, France

[21] Appl. No.: 575,661

[22] Filed: Jan. 31, 1984

[30] Foreign Application Priority Data

Jan. 31, 1983 [FR] France ................................ 83 01447

[51] Int. Cl.⁴ .............................................. G06K 9/50
[52] U.S. Cl. ........................................ 382/21; 382/56
[58] Field of Search ............................ 382/21, 22, 56; 358/260, 263

[56] References Cited

U.S. PATENT DOCUMENTS

| | | | |
|---|---|---|---|
| 3,273,124 | 9/1966 | Greanias | 382/21 |
| 3,609,685 | 9/1971 | Deutsch | 382/21 |
| 4,375,654 | 3/1983 | Evans et al. | 358/260 |

OTHER PUBLICATIONS

Pattern Recognition, vol. 13, No. 3 (1981), K. Ikeda et al., "On-Line Recognition of Hand-Written Characters Utilizing Positional and Stroke Vector Sequences," pp. 191-206.
IEEE International Convention Record, vol. 11, Part 4 (Mar. 25-28, 1963), F. Kuhl, "Classification and Recognition of Hand-Printed Characters," pp. 75-90, 93.
Proceedings of the Fifth International Conference on Pattern Recognition, vol. 1 of 2 (Dec. 1-4, 1980), W. Dana Wasson, "A Preprocessor for Hand-Printed Character Recognition," pp. 703-707.
The Post Office Electrical Engineers Journal, vol. 60, No. 2 (Jul. 1967), E. S. Deutsch, "Computer Simulation of a Character-Recognition Machine, Part 2-Information Recoding and Character Recognition," pp. 104-109.
IBM Technical Disclosure Bulletin, vol. 11, No. 10 (Mar. 1969), M. F. Levy, "Data Comparing Method," p. 1331.
Proceedings of the National Electronics Conference, vol. 18 (1962), H. Freeman, "On the Digital Computer Classification of Geometric Line Patterns," pp. 312-320.

*Primary Examiner*—Leo H. Boudreau
*Assistant Examiner*—Joseph Mancuso
*Attorney, Agent, or Firm*—Oblon, Fisher, Spivak, McClelland & Maier

[57] ABSTRACT

A process for the automatic recognition of an image (I) on the basis of a corresponding reference image, including obtaining, by optoelectronic detection means (C), signals representing both the image to be recognized and the reference image, digitizing (in CAN) and recording the respective signals in a memory (M), using a processing unit (UT) to determine the coordinates of respective characteristic contour lines in the image to be recognized and the reference image, segmenting the respective contour lines and coding the segments (Si), attributing to each segment a pair of values $(p_i, \theta_i)$ relating to its length $(p_i)$ and its angle $(\theta_i)$ compared with a reference direction, and comparing the respective pairs of values while seeking coincidence between the large segments of the contour to be recognized and the reference contour. The process has application to the recognition of shapes, particularly in robotics.

2 Claims, 13 Drawing Figures

PROCESS FOR AUTOMATIC IMAGE RECOGNITION

BACKGROUND OF THE INVENTION

1. Field of the Invention

The present invention relates to a process for the automatic recognition of an image on the basis of a corresponding reference image.

The present invention applies to all fields where it is necessary to recognize an image or an object, e.g. by comparing the image or the object with a reference image or object. It is particularly applicable to the field of robotics, in which research is presently directed towards so-called "intelligent" robots able to interpret information from a external medium.

2. Description of the Prior Art

A process for the automatic recognition of an image on the basis of a corresponding reference image is known, and consists in each case of obtaining, by optoelectronic detection means, analog signals, whose amplitudes are respectively dependent on the intensity levels of the light rays reflected from the image. This process then consists of digitizing by means of an analog-digital converter, the values of the amplitudes of the analog signals, the digitized values being recorded in a memory. By means of a processing unit receiving the stored digital values corresponding to the amplitudes, digital values corresponding to a contour line characterizing the image are then determined. For example, this contour line can be determined by detecting intensity transitions in the light rays from the image, wherein the transitions are defined relative to a predetermined intensity threshold.

The digital values corresponding to the coordinates of the contour line points are stored. This known process also consists of coding, by means of the processing unit receiving the digital values of the coordinates of the contour line points, segments whose ends are located on the lines. These segments make it possible to represent it at the very best in an approximate manner. This is followed by an individual comparison of the segments corresponding to the contour line of the image to be recognized with the segments corresponding to the contour line of the reference image.

Various methods make it possible to code successive segments defining a contour line and there are also various methods for comparing the segments defining the contour line.

One of the methods used for coding segments defining a contour line consists of defining each segment by the cartesian coordinates of its ends, the segments representing very varied orientations relative to a reference direction. This method consists of obtaining, by optoelectronic detection means, analog signals, whose amplitudes respectively depend on the intensity levels of the light rays from the image or the contour to be recognized. The values of the amplitudes of the analog signals are digitized and the digital values obtained are recorded in a memory. By means of a processing unit receiving the stored digital values of the amplitudes, digital values corresponding to the coordinates to the points of at least one contour line characterizing the image in a reference line X, Y are determined, the values of these coordinates then being stored. Using the processing unit receiving the digital values of the coordinates of the contour line points, successive segments whose ends are located on this line are coded, these codes then are stored at the same time as the digital values of the coordinates of the ends of the corresponding segments. For each segment of the line to be recognized and the reference contour and on the basis of coded values of the segments and the coordinates of their ends, a pair of characteristic values $\rho i, \theta i$ are obtained and, in curvilinear coordinates, correspond respectively to the length $\rho i$ of each segment and to the angle $\theta i$ formed by the segment with respect to a reference direction. The pairs of characteristic values obtained respectively for the segments of the contour to be recognised and the reference contour are compared.

This method is particularly ineffective, when the image has continuous contours for which it is then necessary to record a large amount of information for adjacent points. The main disadvantage of this method is that it unnecessarily fills up the memory of the processing unit making it possible to analyze the contour on the basis of these segments.

One of the methods making it possible to carry out a comparison between the segments corresponding to the contour line of the image to be recognized and the segments corresponding to the contour line of the reference image consists of using "developed codes" of the segments defining the contour to be recognized and the segments defining the reference contour. A developed code is the curve obtained by carrying on the abscissa the curvilinear path of the segments and on the ordinate the angle formed between the considered segment and the horizontal. This curve is called a "signature". The aforementioned known method then consists of investigating whether the distance between the signature of the reference contour and the signature of the contour to be recognized is of a minimum nature. Thus, when this distance is at a minimum, it is possible to affirm that the contour to be recognized corresponds to the reference contour. Thus, the measurement of the distance between the two signatures consists of measuring the area separating them. The main disadvantage of this method is that it requires a long processing time.

SUMMARY OF THE INVENTION

The object of the invention is to obviate the above described disadvantages and more particularly to make it possible to automatically recognize an image on the basis of a corresponding reference image, without it being necessary to take up a large amount of space in the memory of a processing unit and without it being necessary to occupy the processing unit for a long period of time.

The present invention is therefore directed at a process for the automatic recognition of an image (I) on the basis of a corresponding reference image, wherein for both the reference image and the image to be recognized, the following steps are performed:

obtaining by optoelectronic detection means (C), analog signals whose amplitudes respectively depend on the intensity levels of the light rays reflected from the image, digitizing the values of the amplitudes of the analog signals, the digital values obtained being recorded in a memory (M), determining, by means of a processing unit (UT) receiving the stored digital values of the amplitudes, digital values corresponding to the coordinates of the points of at least one contour line (L) characterizing the image in a reference plane (XY), the values of these coordinates then being stored, coding, by means of the reference unit (UT) receiving the digital values of the coordinates of the points of the contour line (L), successive segments (Si), whose ends are located on the line, the coded segments then being stored at the sametime as the digital values of the coordinates of the ends of the corresponding segments, obtaining, for each segment of the contour to be recognized and the reference contour, and on the basis of the coded segments (Si) and coordinates of their ends, a pair of characteristic values $\rho i$, $\theta i$, which respectively correspond in curvilinear coordinates to the length $\rho i$ of each segment and to the angle $\theta i$ formed by the segment with a reference direction, comparing the pairs of characteristic values obtained respectively for the segments of the contour to be recognized and the reference contour, wherein the comparison includes investigating, on the basis of these pairs, coincidences between large corresponding characteristic segments of the reference contour and the contour to be recognized, a large segment resulting from a contour being a segment which can be inscribed in a rectangle of limiting dimensions $\Delta\rho_s, \Delta\theta_s$, a large segment for which $\Delta\rho_s$ is larger than $\Delta\theta_s$ said to be a rectilinear characteristic of the contour ($\Delta\rho_s$ is locally the greatest length of a segment which is compatible with an angular variation $\Delta\theta_s$), a large segment for which $\Delta\theta_s$ is larger than $\Delta\rho_s$ being called the angle variation characteristic of the contour ($\Delta\theta_s$ being locally the greatest angular variation compatible with a segment length $\Delta\rho_s$), a large segment A of the reference contour coinciding with a large segment B of the contour to be recognized for a displacement ($\rho_o, \theta_o$), if by making coincide the origin of the reference defining A and the point ($\rho_o, \theta_o$) in the reference defining B, the following properties are proved in curvilinear coordinates $$\rho_A - \rho_B - \rho_o < \Delta\rho_1$$

$$\theta_A - \theta_B - \theta_o < \Delta\theta_1$$

wherein $\Delta\rho_1$ and $\Delta\theta_1$ are fixed.

According to another feature, the investigation of the coincidences also consists in the developed images (DL1, DL2) on the basis of the respective segments of the two contour lines of the reference image and the image to be recognized in a reference ($\rho, \theta$) of bringing the unknown developed image DL$_2$ to a length equal to the length of the developed reference image DL$_1$ by a homothetic transformation of its evolute of ratio L$_1$/L$_2$ and then, for these two images centered around the mean value ($\theta_o$) and both having the same length (L$_1$) determining the area (A) separating said two images, the comparison of this area with a threshold making it possible to affirm, when it is below the threshold, that the image to be recognised corresponds to the reference image.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figures 1, 2:
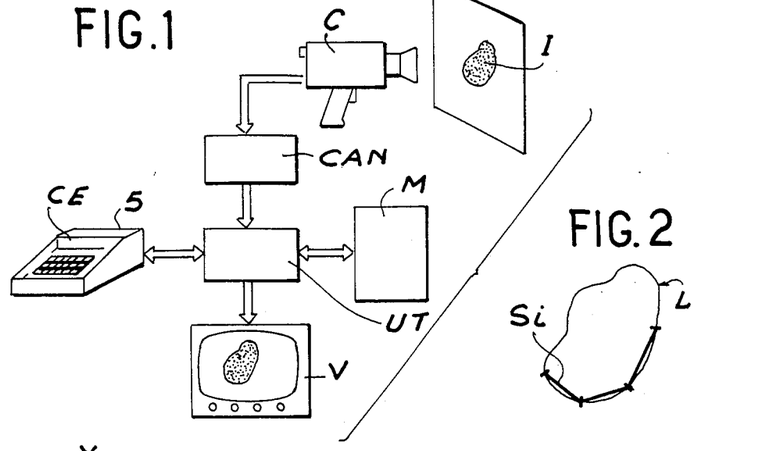
FIG. 1 is a schematic block diagram of an apparatus making it possible to perform the process according to the invention.
FIG. 2 is a representation of, a contour line of an object or image obtained during the performance of the process according to the invention, the contour line then being segmented.

Referring now to the drawings, wherein like reference numerals designate identical or corresponding parts throughout the several views FIG. 1 diagrammatically shows an apparatus making it possible to perform the process according to the invention. This apparatus includes optoelectronic detection means C e.g. constituted by a video camera. These detection means supply analog signals, whose amplitudes respectively depend on the intensity levels of the light rays from an image or object I to be recognized and a reference image or object. The apparatus according to the invention makes it possible to compare these two images. The optoelectronic means C are connected to a processing unit UT, e.g. by means of an analog-digital converter CAN.

This processing unit is itself connected to a memory, as well as to a display means V, making it possible e.g. to monitor the operation of the apparatus. An information or data input console CE is connected to the processing unit UT. The analog-digital converter CAN makes it possible to convert the values of the amplitudes of the signal supplied by the optoelectronic means C into digital values, which are then recorded in a memory M.

Following this digitization of the signal supplied by the optoelectronic means, the process of the invention, both for the object or image to be recognized and for the reference image or object, determines by means of the processing unit (UT), digital values corresponding to coordinates of points of a contour line characteristic of the reference image and corresponding to coordinates of the points of this contour line for the image to be recognized. These digital values are recorded in the processing unit memory M.

Thus, for example, if the image to be recognized is a surface I having a dark colour on a light background and the reference image is itself a surface of the same shape and size and of dark color on a light background, processing unit UT makes it possible to record in memory M digital values corresponding respectively to coordinates of the points of a contour line L for the reference image and to the coordinates of the points of a contour line of the same shape and size for the image to be recognized. The contour line L is shown in FIG. 2.

Figure 3:
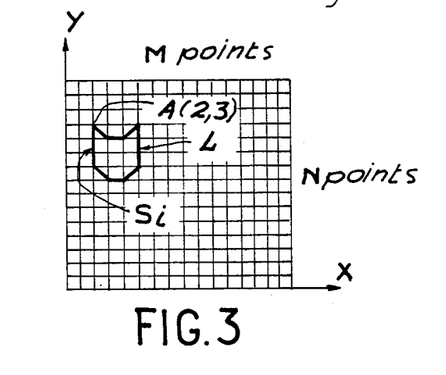
FIG. 3 is a graph illustrating segmentation of a contour line in accordance with the so-called Freeman code.

Preferably, according to the process of the invention, segments of the contour line are coded in accordance with the Freeman vector coding method. This coding method can be better understood by referring to FIGS. 3 and 4. It is assumed that the contour L of the image to be recognized or the reference image shown in FIG. 3 is spatially digitized in a matrix representing M×N points in a reference plane X, Y. The Freeman coding method consists of coding elementary displacements performed along a segmented contour line L. In the selected matrix representation, in which the matrix is square (M=N), there are only 8 orientation possibilities for passing from one point to another contour. These 8 possibilities are represented by the 8 Freeman vectors numbered 0 to 7 in FIG. 4. These 8 vectors are in fact displaced by $\pi/4$ in the considered matrix representation example. Thus, the Freeman vectors make it possible to define successive coded oriented segments, whose ends are located in the vicinity of each contour line. The coordinates of these ends are obviously known on the basis of coordinates of the points of each contour line.

Figure 4:
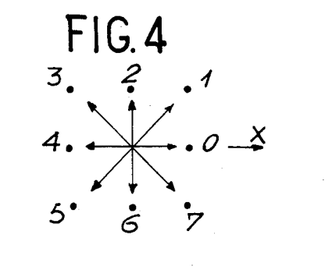
FIG. 4 is a diagramatic representation of Freeman vectors associated with the Freeman code.

In the segmented contour example L shown in FIG. 3, if the starting point for the course of this contour is point A of coordinates 2 and 3 in the chosen matrix, the Freeman chain associated with contour L can be expressed, as a function of the vector numbers of FIG. 4, in the following way:

7, 0, 1, 6, 6, 6, 5, 4, 3, 2, 2, 2.

This coding is particularly interesting because it shows the orientation of the segments of the contour line relative to the reference direction X.

The following operation consists of defining code segments Si, whose ends are located on each contour line, so as to bring about an optimum approach of each contour line by a segmented contour line.

Figure 5:
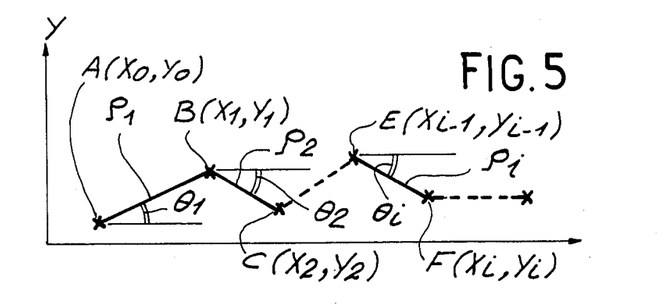
FIG. 5 is a graph illustrating, diagrammatically, a segmented contour line in a cartesian coordinate X, Y giving a better understanding of the representation of the contour line in curvilinear polar coordinates.

This is followed by a comparison of the coded segments corresponding to the contour line of the image to be recognized and the coded segments corresponding to the contour lines of the reference image. For each of the contour lines of the reference image and the image to be recognized, this comparison firstly consists of obtaining for each segment, on the basis of digital values corresponding to the ends of these segments, a pair of characteristic values corresponding respectively to the angle $\theta_1$ formed by the segment with respect to the reference direction X, as well as the length $\rho_i$ of the segment. This amounts to carrying out a curvilinear polar coding of each segment. The curvilinear abscissa of each segment end is recorded, together with corresponding orientation of the segment. In FIG. 5 in cartesian coordinates, the coordinates of points A, B, C . . . F are respectively $(X_0, Y_0)$, $(X_1, Y_1)$, $(X_2, Y_2)$ . . . $(X_i, Y_i)$. For example, segment AB is defined by the coordinates of its ends. In curvilinear polar coordinates, each segment is defined by the curvilinear abscissa of its end and by its orientation: $\rho_1$, $\theta_1$ e.g. for segment AB, if A is the starting point of the contour. Segment BC is defined by its curvilinear abscissa $\rho_1$, its length $\rho_2$ and its orientation $\theta_2$. The curvilinear polar coding described hereinbefore leads to the translation of the segmented contour line being invariable and to a rotation being translated by a "continuous component", on the complete coded segments, the orientation of each segment being increased by the rotation angle value.

The comparison of the segments then consists of investigating whether there is a group of coincidences, respectively between the pairs of characteristic values $(\rho_i, \theta_i)$ corresponding to the contour line of the image to be recognized and the pairs of characteristic values corresponding to the contour line of the reference image.

Figure 6:
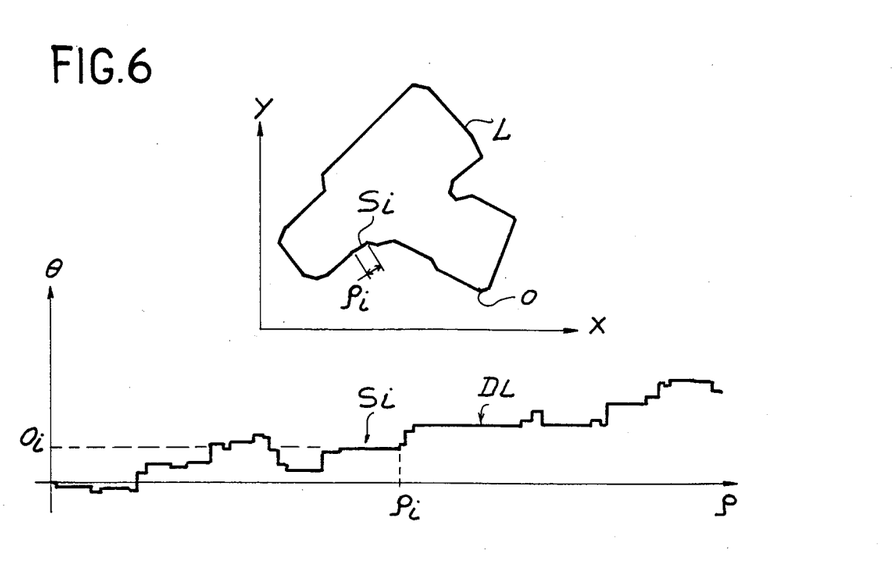
FIG. 6 is a diagrammatic representation of, a contour line in a cartesian coordinate X, Y and the developed image of the contour line in curvilinear polar coordinates in a reference ($\rho, \theta$).

This coincidence group investigation will now be described in greater detail with the aid of FIG. 6. It consists of detecting a group of coincidences between the pairs of characteristic values corresponding to the contour line of the image to be recognized and the pairs of characteristic values corresponding to the contour line of the reference image on the basis of developed images of these two lines in a cartesian coordinate $\rho$, $\theta$. In the latter, on the abscissa is plotted curvilinear abscissas $\rho_i$ of segments Si of the reference contour or the contour to be recognized. On the ordinate is plotted the angles $\theta_i$ formed respectively by the segments of the contour to be recognized or the reference contour with the hereinbefore defined reference direction X. The developed image of a contour line L in coordinate X, Y is represented by DL in coordinate $\rho$, $\theta$.

Figure 7:
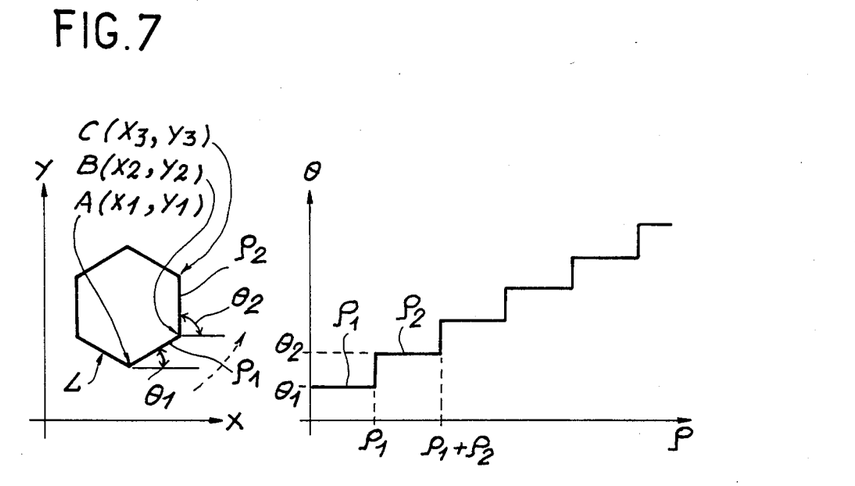
FIG. 7 is a diagrammatic example of a hexagonal contour line in a cartesian coordinate X, Y and the developed image of the contour line in polar curvilinear coordinates in a reference ($\rho, \theta$).

FIG. 7 permits a better understanding of the obtaining of a developed image in curvilinear polar coordinates. FIG. 7 shows in a cartesian coordinate X, Y, a hexagon whose apices are shown at A, B, C . . . . These apices have as their respective coordinates $(X_1,Y_1)$, $(X_2,Y_2)$, $(X_3,Y_3)$. The segments AB, BC have the respective lengths $\rho_1, \rho_2, \ldots$ The angles formed by these segments with the reference direction X are respectively $\theta_1, \theta_2, \ldots$ It is assumed in FIG. 7 that in the representation in curvilinear polar coordinates $\rho$, $\theta$, the hexagon L is traversed in direction AB from point A. In coordinate $\rho$, $\theta$, the developed image of the hexagon is a succession of "steps", the first step is parallel to axis $\rho$ and has as ordinates $\theta_1$. Its length is that of segment AB and consequently corresponds to the curvilinear abscissa of end B of the segment, i.e. $\rho_1$. A vertical segment parallel to axis $\theta$ is then found, whose ordinate is $\theta_2$. In the same way, the second step corresponds to segment BC and it is parallel to axis $\rho$ and has a length $\rho_2$, its curvilinear abscissa being $\rho_1+\rho_2$.

In order to investigate the coincidences between the contour line of the reference image and the contour line of the image to be recognized, the developed images of these lines are represented in a coordinate $\rho$, $\theta$ in such a way as to investigate these coincidences on the basis of the superimposing of these two developed images.

An attempt will now be made to establish whether it is possible to simplify the developed images of the reference contour line and the contour line of the image to be recognized.

It will be investigated whether there is an elementary group of developed images corresponding to a group of segments, which can be reduced to a single resultant developed image corresponding to a single resultant segment, the latter continuing to define a portion of the considered contour line. As will be shown hereinafter, this resultant segment must remain within a predetermined angular tolerance relative to the angle formed by the first segment of the considered group and the reference direction. The investigation of the coincidences will then be carried out on developed images in which the resultant developed images have been investigated.

Figure 8:
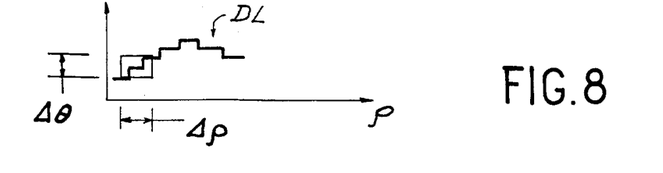
FIG. 8 is a diagrammatic representation of a developed image of a contour line permitting a better understanding of one of the performance modes of the process according to the invention, in which use is made of the so-called "large segment" principle.
Figure 9:
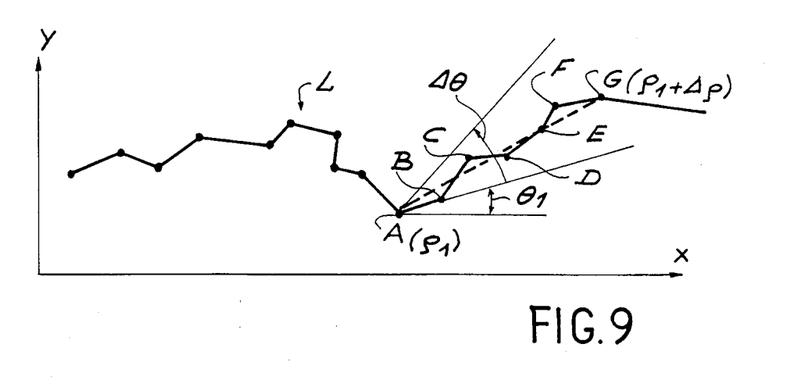
FIG. 9 is a diagrammatic representation of a contour line in a cartesian coordinate X, Y permitting a better understanding of the "large segment" method.

FIGS. 8 and 9 provide a better understanding of this performance of the process according to the invention. FIG. 8 shows a developed image of a contour in curvilinear polar coordinates in a reference $\rho$, $\theta$. If the developed image DL shown in FIG. 8 corresponds e.g. to the development of the contour line of the reference image, there is obviously a not shown developed image for the contour line of the image to be recognized, which must be compared with the reference developed image shown in the drawing. The term large segment or resultant segment of a contour line will be used for any succession of segments, whose developed coding is written in a rectangle of size $\Delta\rho, \Delta\theta$, as shown in FIG. 8.

If $\Delta\rho$ is larger than $\Delta\theta$, the resultant segment in a cartesian coordinate X, Y can be called "rectilinear characteristic of length $\Delta\rho$". If $\Delta\rho$ is smaller than $\Delta\theta$, the resultant segment in cartesian coordinate X, Y can be called "characteristic of angle $\Delta\theta$".

As shown in FIG. 9, a rectilinear characteristic means on contour line L in a cartesian coordinate X, Y that the group of segments AB, BC, CD, DE, FG can be approached or approximated by a single segment AG, if all the segments are included in an angle $\theta_1$ relative to the angle $\Delta\theta$ formed by the first segment AB of this group and the reference direction X. In the developed image of FIG. 8, this group of segments is contained in the rectangle of dimensions $\Delta\rho$, $\Delta\theta$ (point G having for its curvilinear abscissa the value $\rho_1 + \Delta\rho$).

If all the segments of the group have directions remaining in a predetermined angular tolerance $\Delta\theta$ relative to the direction $\theta_1$ of the first segment, these segments can be approached or approximated by a single segment AG, which is translated into the developed image of FIG. 8 by the replacement of the developed images of these segments contained in rectangle $\Delta\rho$, $\Delta\theta$ by a single developed image represented by a single step of length $\Delta\rho$. An investigation will now be made as to whether it is possible to carry out the same simplification for other portions of the considered contour line.

The characteristic extraction algorithm consists of calculating for each segment origin the greatest length $\Delta\rho_s$ compatible with an imposed angular error $\Delta\theta_o$ and the largest angular error $\Delta\theta_s$ compatible with the imposed length $\Delta\rho_o$.

The algorithm then classifies the large characteristic segments into two tables with their curvilinear coordinates:

rectilinear characteristics: $\Delta\rho_i$, $\rho_i$, $\theta_i$ by decreasing order of the values $\Delta\rho_i$, angle characteristics: $\Delta\theta_j$, $\rho_j$, $\theta_j$ by decreasing order of the values $\Delta\theta_j$.

The classification stops as soon as the characteristic becomes non-significant (as soon as it drops below the largest characteristic divided by a predetermined integer, e.g. 3).

According to this first embodiment of the process according to the invention, the coincidences between the extracted characteristics for the reference contour line and for the contour line to be recognized will be investigated by superimposing these two extracted characteristics.

Similarities are made to appear in the overall characteristics extracted: the large segments. Two large or resultant segments are said to be compatible to within $(\rho_l, \theta_l)$ of their lengths are equal to within $\rho_l$ and their widths are equal to within $\theta_l$.

A large segment A $(\rho_A, \theta_A, \Delta\rho_A, \Delta\theta_A)$ is said to coincide with a large segment B $(\rho_B, \theta_B, \Delta\rho_B, \Delta\theta_B)$ for a displacement $(\rho_o, \theta_o)$ if on bringing about the coincidence between the origin of the developed reference defining A with the point $(\rho_o, \theta_o)$ in the developed reference defining B, the following properties are proved:

the curvilinear abscissas of the large segments A and B have an error or variation given within a threshold $\Delta\rho_l$:

$$\rho_A - \rho_B - \rho_o < \Delta\rho_l$$

the angles corresponding to the coordinates of the large segments A and B have a variation or error below a given threshold $\Delta\theta_l$:

$$\theta_A - \theta_B - \theta_o < \Delta\theta_l,$$

the dimensions of the large segments being compatible to within $(\rho_l, \theta_l)$.

Thus, the coincidence of these two large characteristic segments means that two corresponding images contain two characteristic lines which are "alike", located on the same curvilinear abscissa and having an identical orientation (to within the tolerance variations). The recognition algorithm based on the principle of coincidences consequently brings about coincidence between a characteristic large segment of the image to be recognized and a characteristic large segment of a reference image. If these large segments satisfy the likeness criteria, the displacement vector $(\rho_o, \theta_o)$ is calculated, followed by an investigation as to whether the other large segments of the image to be recognized coincide with the large segments of the reference image.

The number of marked coincidences constitutes the recognition criterion. It is considered that the image to be recognized corresponds to the reference image as a function of the value of the number of detected coincidences. In practice, this algorithm is very fast, because the number of large segments is generally limited.

According to a second embodiment, the process according to the invention includes combining the first mode with a known distance measuring process. This known process consists in the developed images of two contour lines of the reference image and the image to be recognized, in the coordinate $\rho$, $\theta$, of calculating the mean angular values $\theta_{m1}$ and $\theta_{m2}$ respectively corresponding to the angular mean values of the segments of these lines. The mean values in question are then centered on a common value $\theta_o$ in the two developed images of the two lines. Homothetic transformation with a constant ratio is used for obtaining in developed images of two contour lines, equal sums of segment lengths. Following the treating of these two images, the area separating them are determined and the determined area represents the likeness between said two developed images. The comparison of the determined area with a limiting area of threshold makes it possible to affirm when the representative area is below the threshold that the image to be consequently recognized corresponds to the reference image.

Figure 10:
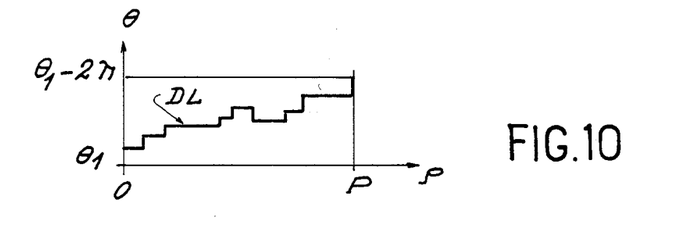
FIGS. 10, 11 and 12 are diagrammatic representations of a developed image in polar curvilinear coordinates designed to provide a better understanding of certain definitions regarding the developed image of a segmented contour line.
Figure 11:
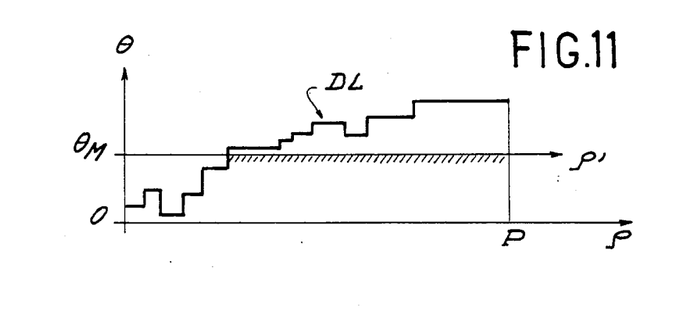
Figure 12:
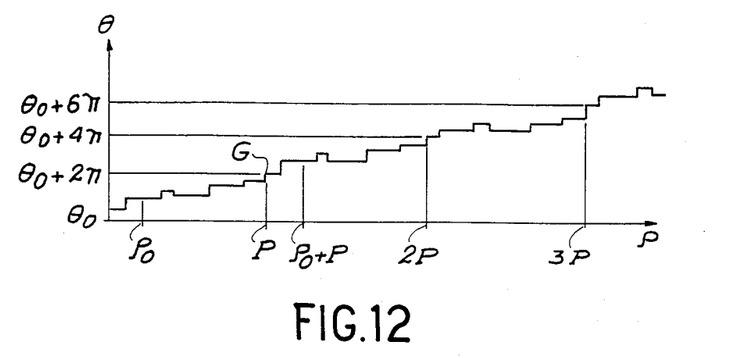

FIGS. 10 and 11 will permit a better understanding of this coincidence investigation procedure. FIG. 10 shows the developed image DL of the reference contour line or the contour line to be recognized. This developed image in coordinate $\rho$, $\theta$ can be qualified as the "signature" of the contour line. The signature of a closed, segmented contour is in fact its developed image. In this developed image, the curvilinear abscissa is limited between 0 and the perimeter P of the contour. This perimeter can be called the "signature length", or alternatively the developed image length. This length extends between 0 and P in the drawing. The representation of a segmented contour by its developed image is biunivocal. In the represented example, the initially considered segment on the contour line forms an angle $\theta_1$ with the reference direction X in a cartesian coordinate X, Y. The considered contour being assumed as closed, the signature extends over $2\pi$ on axis $\theta$.

The signature or "standardized developed image" in the coordinate $\rho$, $\theta$ is that representing a mean zero angle value in the coordinate. A developed image or signature is standardized by calculating the mean value $\theta_m$ of its angle over the totality of its length or perimeter (mean value of the angle $\theta$ formed by segments Si with the reference direction X in coordinate X, Y).

The standardized developed image or standardized signature is shown in FIG. 11. The standardized developed image or signature can be now considered in reference $(\rho', \theta)$. Thus, this standardization consists of calculating the mean values $\theta_m$ of the angles $\theta_i$ formed in the segmental contour line by the different segments with the reference direction. The reference $(\rho, \theta)$ is in fact a translated reference of reference $(\rho', \theta)$ of a value $\theta_m$. In this other embodiment of the process according to the invention, mean values $\theta_m$ are sought for the developed images or signatures of the reference contour of the contour to be recognized.

In this embodiment of the process according to the invention, there is an evaluation of the likeness between the developed images or signatures of the reference contour line and the line of the contour to be recognized. The first operation performed in this embodiment is to investigate the mean value $\theta_m$ of the angles for the segments for each of these contours, so as to be able to center the signatures on the same value $\theta_o$, which can have a value $\theta_o=0$. The likeness can only be evaluated if the two developed images or signatures are standardized ($\theta_m$ centered on $\theta_o$ for the two developed images) and if the two developed images or signatures have the same length or perimeter P.

Figure 13:
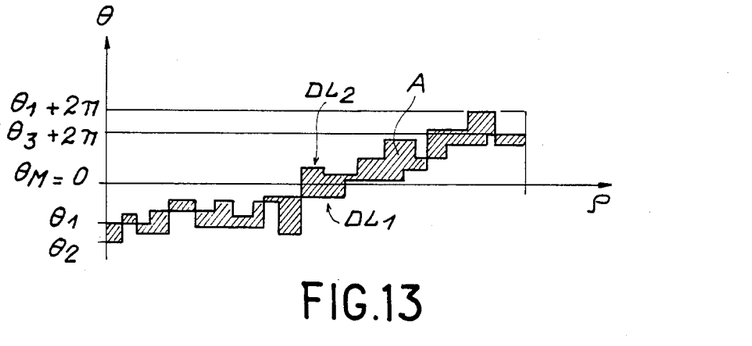
FIG. 13 is a diagrammatic representation of a developed image in polar curvilinear coordinates of another embodiment of the process according to the invention, in which use is made of the area separating the developed images corresponding respectively to the lines of the reference contour and the contour to be recognized.

FIG. 13 shows in coordinates $\rho$, $\theta$, developed images or signatures $DL_1$, $DL_2$ corresponding respectively to the contour lines of a reference image and an image to be recognized and not shown in FIG. 13. These two signatures are standardized (centered on the mean value $\theta_m=0$) and have the same length or perimeter. As the lengths or perimeters are equal in the two developed images, this in fact corresponds in the two segmented contour lines to obtaining equal segment length sums for these two lines.

The distance between the two developed images or segmented signatures $DL_1$ and $DL_2$ in standardized form and having the same length is equivalent to the sum, in absolute values, of the areas defined by the segments representing said signatures. This sum is in fact the hatched area A in the drawing. This area represents the likeness between the two developed images or signatures. Therefore, it represents the likeness between the segmented lines of the contours of the reference image and the image to be recognized. Thus, it is possible to fix a limit or threshold, such that when area A separating the two developed images or signatures is below this threshold, it is possible to conclude that the image to be recognised corresponds to the reference image.

In the second embodiment of the process according to the invention, it is possible to combine the known signature comparison process described hereinbefore with the first embodiment, in which are used the rectilinear characteristics and the large segment angle characteristics. Thus, the advantages of the first embodiment of the process according to the invention are combined with those of the known process, i.e. rapidity of sorting the rectilinear characteristics and angle characteristics and the high accuracy of the correlation method on the signatures. In this second embodiment of the invention, the algorithm is as follows. The number of coincidences between the large segments of the image or the contour to be recognised and the image or the reference contour is calculated. This leads to the aforementioned coincidence table. Each column contains the number of coincidences obtained, called coincidence notes.

At the end of this processing, the likeness of the signatures defined hereinbefore is measured for the reference image which had the greatest number of coincidences with the image to be recognized. The abscissa taken as the origin on the image or contour to be recognised is the abscissa of the first large segment. The abscissa taken as the origin on the reference contour or image is that of the corresponding large segment. This likeness measurement is only carried out for a small number of displacements (e.g. approximately 1/20 of the perimeter) of the image or contour.

If, as a result of this calculation, the minimum distance found is too great, the immediately lower "note" is taken from the characteristics table provided that it remains acceptable (above a minimum value) and the likeness measurement is recommenced with the new reference image.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the automatic recognition of an image (I) on the basis of a corresponding reference image, comprising:

obtaining by optoelectronic detection means for the reference image and the image to be recognized, analog signals whose amplitudes respectively depend on the intensity levels of light rays reflected from the respective images, digitizing the analog signals into digital values and storing the digital values in a memory, determining for both the reference image and the image to be recognized, by means of a processing unit (UT) which receives the respective stored digital values, digital values corresponding to the coordinates of the points of at least one contour line (L) characterizing the respective images in a reference plane (XY), the values of these coordinates then being stored, coding, by means of a reference unit (UT) receiving the digital values of the coordinates of the points of the contour line (L) for both the reference image and the image to be recognized, successive segments (Si), each having ends located on said contour line, said coded digital values being then stored at the same time as the digital values of the coordinates of the ends of the corresponding segments, obtaining, for each segment of the contour of the image to be recognized and of the contour of the reference image and on the basis of their ends, a pair of characteristic values $\rho i$, $\theta i$, which respectively correspond in curvilinear coordinates to the length $\rho i$ of each segment and to the angle $\theta i$ formed by said segment with respect to a reference direction, wherein the characteristic values $\rho i$, $\theta i$ for the segments (Si) of the reference contour and the contour to be recognized define respective developed images (DL1, DL2), comparing the pairs of characteristic values obtained respectively for the segments of the contour of the image to be recognized and of the contour of the reference image, wherein the comparing comprises investigating, on the basis of these pairs, coincidences between large corresponding characteristic segments of the reference contour and the contour to be recognized, wherein a large segment is defined relative to a contour as a segment which can be inscribed in a rectangle of limiting dimensions $\Delta\rho_s$, $\Delta\theta_s$, a large segment for which $\Delta\rho_s$ is larger than $\Delta\theta_s$ being said to be a rectilinear characteristic of the contour, wherein $\Delta\rho_s$ is locally the greatest length of a segment which is compatible with an angular variation $\Delta\theta_s$, a large segment for which $\Delta\theta_s$ is larger than $\Delta\rho_s$ being said to be the angle variation characteristic of the contour, wherein $\Delta\theta_s$ is locally the greatest angular variation compatible with a segment length $\Delta\rho_s$, a large segment A of the reference contour coinciding with a large segment B of the contour to be recognized for a displacement $(\rho_o, \theta_o)$, if by making the origin of the reference large segment A and the point $(\rho_o, \theta_o)$ in the large segment B coincide, the following properties are proved in curvilinear coordinates $$\rho_A - \rho_B - \rho_o < \Delta\rho_1$$

$$\theta_A - \theta_B - \theta_o < \Delta\theta_1$$

wherein $\Delta\rho_1$ and $\Delta\theta_1$ are fixed.

2. A process according to claim 1, wherein the investigating step comprises:

developed image $DL_2$ of the contour to be recognized to a length equal to the length of the developed reference image $DL_1$ of the reference contour by means of a homothetic transformation of its evolute of ratio $L_1/L_2$ and then, for these two images centered around the mean value $(\theta_o)$ and both having the same length $(L_1)$, determining the area (A) separating said two images, then comparing said area (A) with a threshold, and then deciding when said area (A) is below said threshold that the image to be recognized corresponds to the reference image.

* * * * *